United States Patent [19]

Cornelius et al.

[11] Patent Number: 4,677,141

[45] Date of Patent: Jun. 30, 1987

[54] METHOD OF IMPROVING HEAT STABILITY OF PIGMENTABLE SILICONE ELASTOMER

[75] Inventors: David J. Cornelius, Saginaw; Richard L. Przybyla, Midland, both of Mich.

[73] Assignee: Dow Corning Corporation, Midland, Mich.

[21] Appl. No.: 403,825

[22] Filed: Jul. 30, 1982

Related U.S. Application Data

[63] Continuation-in-part of Ser. No. 228,054, Jan. 26, 1981, abandoned.

[51] Int. Cl.$^4$ ............................................. C08K 3/36
[52] U.S. Cl. ................................. 523/203; 524/445; 524/447; 524/493
[58] Field of Search .................... 524/447, 445, 493; 523/203

[56] References Cited

U.S. PATENT DOCUMENTS

| | | | |
|---|---|---|---|
| 3,050,490 | 8/1962 | Nitzsche et al. | 260/37 |
| 3,050,491 | 8/1962 | Nitzsche et al. | 260/37 |
| 3,070,567 | 12/1962 | Nitzche et al. | 260/37 |
| 3,341,489 | 9/1967 | Simpson | 260/37 |
| 3,588,318 | 6/1971 | Ollis | 174/121 |
| 4,265,800 | 5/1981 | Newton | 260/37 |

FOREIGN PATENT DOCUMENTS

588913 12/1959 Canada .

OTHER PUBLICATIONS

Ritchie, P. D., *Plasticizers, Stabilizers, and Fillers,* Iliffe Books, Ltd, London, England, p. 261.
"Silane Coupling Agents in Mineral-Reinforced Elastomers," Union Carbide Corporation, marked F-44715B.

*Primary Examiner*—John C. Bleutge
*Assistant Examiner*—Robert E. L. Sellers, II
*Attorney, Agent, or Firm*—Edward C. Elliott

[57] ABSTRACT

A method of improving the heat stability of silicone elastomers is disclosed. An improved pigmentable silicone elastomeric composition is produced by mixing a silicone elastomer composition having a vinyl radical content of from 0.01 to 0.1 percent by weight with a pretreated, white clay having a surface area of less than 50 m$^2$/g, said surface containing olefinic unsaturated siloxy groups, and an organic peroxide vulcanizing agent. The improved silicone elastomeric composition is formed, then heated to vulcanize, to yield a silicone elastomer having improved resistance to the effects of elevated temperatures. The improved silicone elastomeric composition is also claimed. The improved silicone elastomeric composition can be pigmented.

11 Claims, No Drawings

METHOD OF IMPROVING HEAT STABILITY OF PIGMENTABLE SILICONE ELASTOMER

This application is a continuation-in-part of application Ser. No. 228,054, filed Jan. 26, 1981, which is now abandoned.

BACKGROUND OF THE INVENTION

1. Field of the Invention

This invention relates to a method of improving the heat stability of pigmentable silicone elastomers that are catalyzed with organic peroxides and vulcanized with heat.

2. Description of the Prior Art

Elastomeric materials based upon polyorganosiloxane polymers have found usefulness in part due to the resistance of the materials to the effects of elevated temperatures. In spite of the inherent heat stability of the polyorganosiloxane polymers, much work has been done to improve their heat stability.

The majority of the heat stability additives discovered are metallic oxides. Iron oxide is the most commonly used metallic oxide. Some metallic salts are also useful. Many of these additives are not useful when it is desired to impart a particular color to the elastomer, because the metallic oxides and salts, per se, produce color in a silicone elastomer.

In U.S. Pat. No. 3,341,489, issued Sept. 12, 1967, Simpson discloses the addition of certain olefinically unsaturated organosilicon materials such as vinyltriethoxysilane to an organopolysiloxane composition which is convertible to a cured, solid, elastic state. The resulting composition could be directly fabricated to valuable elastomeric products without the necessity of an extended post-cure.

A great variety of different types of materials have been taught as being useful fillers in silicone elastomers ranging from carbon black through finely ground metallic oxides such as silica and aluminum oxide to colloidal silica. Naturally occuring filler materials such as diatomaceous earth and clay have been used.

A brochure entitled "Silane Coupling Agents in Mineral-Reinforced Elastomers", published by Union Carbide Corporation, marked F-44715B, suggests that fillers such as calcined clays treated with vinyl functional silanes can be added to mineral-filled peroxide-cured elastomers, including silicone elastomers, to improve the mechanical and dynamic properties of elastomers. There is no teaching as to a method of improving the heat stability of silicone elastomers. Such treated inorganic fillers have been used in polyester resins, crosslinked polyethylene, ethylene-propylene rubber, and ethylene-propylene terpolymers to give products having improved physical properties.

SUMMARY OF THE INVENTION

A method of improving the heat stability of certain pigmentable silicone elastomeric compositions has been discovered. A silicone elastomeric composition having a vinyl radical content of from 0.01 to 0.1 percent by weight is mixed with a pretreated, white clay having a surface area of less than 50 $m^2/g$, said surface containing olefinic unsaturated siloxy groups, and with an organic peroxide vulcanizing agent. The improved silicone elastomeric composition is formed and then vulcanized by heating. The cured silicone elastomer has improved heat resistance compared to the silicone elastomer stock without the addition of the pretreated, white clay.

It is an object of this invention to provide a method of improving the heat stability of specified silicone elastomers in a convenient and economical manner.

It is an object of this invention to provide a method of improving the heat stability of specified silicone elastomeric compositions in such a manner that the compositions can be pigmented to desired colors.

DESCRIPTION OF THE INVENTION

This invention relates to a method of improving the heat stability of a pigmentable silicone elastomer comprising (A) mixing (1) 100 parts by weight of a mixture consisting essentially of 100 parts by weight of a polydiorganosiloxane gum having organic radicals selected from the group consisting of methyl, vinyl, phenyl, and 3,3,3-trifluoropropyl, and from 10 to 100 parts by weight treated reinforcing silica filler, said mixture (1) having a vinyl radical content of from 0.01 to 0.1 percent by weight; (2) from 1 to 150 parts by weight of pretreated, white clay having a surface area of less than 50 $m^2/g$, said surface having been treated so that the surface contains olefinic unsaturated siloxy groups; and (3) organic peroxide vulcanizing agent to yield an improved silicone elastomeric composition, (B) forming the improved silicone elastomeric composition into a shape, and (C) heating the formed silicone elastomeric composition to an elevated temperature for a time sufficient to vulcanize the silicone composition, the vulcanized silicone elastomer having improved heat stability.

Silicone elastomers have become commercial products, in part, based upon their inherent resistance to the effects of exposure to elevated temperatures. Since their early commercialization, efforts have taken place to improve the heat stability of silicone elastomers. The method of this invention provides improved heat stability to certain silicone elastomers. This method has an added advantage in that it produces silicone elastomeric compositions which can be pigmented to a desired color in addition to having improved heat stability at least as economically as other known methods.

The method of this invention, providing pigmentable silicone elastomers of improved heat stability, depends upon use of the specified silicone mixture (1) and the specified pretreated, white clay (2). The use of the clay (2) in conjunction with the specified silicone mixture (1) has yielded unexpected improvements in heat stability for the resulting silicone elastomer. The improvement in heat stability is obtained without sacrificing the ability of the silicone mixture (1) to be pigmentable. For the purposes of this invention "pigmentable" is defined as the ability of the silicone elastomers to be mixed with various pigments to obtain desired colors or hues, including such colors as white or yellow. A particular use of the pigmentable silicone elastomers of this invention is as insulation on electrical wiring. It is necessary to be able to produce such insulation in a variety of colors, including such light colors as white or yellow, and to be able to easily distinguish between such colors as green and blue and black because the colors are used to identify particular wires.

The silicone mixture (1) useful in this invention is commercially available in several embodiments. Those mixtures which contain the required vinyl radical content of from 0.01 to 0.1 percent by weight are operable. The mixtures contain polydiorganosiloxane gum having organic radicals selected from the group consisting of methyl, vinyl, phenyl, and 3,3,3-trifluoropropyl, said radicals being bonded to the silicon atoms of the polydiorganosiloxane. The polydiorganosiloxanes are commonly of a viscosity of from 1000 Pa.s up to and including non-flowing gums.

The mixture (1) also contains reinforcing silica filler to improve the physical strength of the polymer. Reinforcing silica fillers have a surface area of from 150 m$^2$/g to greater than 400 m$^2$/g These reinforcing silica fillers are well known in the art and can be obtained commercially. The reinforcing silica filler can be treated or treated in situ during the manufacture of the mixture. The treated reinforcing silica fillers can be treated by any one of the conventional methods described in the prior art, wherein the treating agents include organosilanes, organosiloxanes, and silazanes. Methods of preparing treated reinforcing silica are disclosed in U.S. Pat. No. 3,122,516, issued Feb. 25, 1969 to Polmanteer; U.S. Pat. No. 3,334,062, issued Aug. 1, 1967 to Brown and Hyde; U.S. Pat. No. 3,635,743, issued Jan. 18, 1972 to Smith; and U.S. Pat. No. 3,624,023, issued Nov. 30, 1977 to Hartage, which are hereby incorporated by reference to show the preparation of treated silica fillers. The amount of treated reinforcing filler can vary from 10 to as much as 100 parts by weight with the preferred amount varying between 25 to 85 parts by weight per 100 parts by weight of the polydiorganosiloxane.

If the reinforcing silica filler is not treated as described above, it is necessary to treat the reinforcing silica in situ during the mixing step to prevent reaction between the polydiorganosiloxane gum and the reinforcing filler. This reaction produces a mixture that becomes too stiff to be workable, a phenomenon known as crepe-hardening. The reinforcing silica can be treated in situ by adding anticrepe-hardening agents during the mixing of the composition. During the preparation of mixture (1), the mixture may be heated during the mixing step to improve the reaction between the hydroxyl radicals on the surface of the reinforcing silica and the anticrepe-hardening agents. Useful anticrepe-hardening agents are well known in the art. They include low molecular weight silanes, siloxanes and silazanes. Short chain siloxanes, typically endblocked with hydroxyl or alkoxy groups so that they may react with the hydroxyl groups present on the surface of the reinforcing filler, are often used. The organic radicals present in the anticrepe-hardening agents are the same as those found in polydiorganosiloxane gum, methyl radical is preferred.

The silicone elastomeric composition may also contain minor amounts of additive to improve the properties such as handling, compression set, oil resistance, etc. The additives should be those which do not impart color to the composition unless the additive imparts a color which is desired.

The pigmentable silicone elastomeric composition may be composed of a single polydiorganosiloxane gum or a mixture of different gums. The composition may also contain a single reinforcing silica filler or a mixture of reinforcing silica fillers.

The mixture (1) or combination of mixtures is required to have a vinyl radical content of from 0.01 to 0.1 percent by weight. The vinyl radicals may be present in the polydiorganosiloxane, the anticrepe-hardening agent, on the surface of the reinforcing filler, or in other additives used in the mixture. The preferred vinyl radical content is from 0.025 to 0.1 percent by weight.

The other critical ingredient present in the silicone elastomeric composition used in the method of this invention is a pretreated, white clay having a surface area of less than 50 m$^2$/g. The surface of the clay has been treated so that it contains olefinic unsaturated siloxy groups.

The surface area of fillers normally varies with the particle size and is useful in describing the physical nature and size of small particles. As the particles become smaller, the surface area increases. A kaolin clay of an average particle size of 4.5 micrometers has a surface area of 6 to 7 m$^2$/g and clays of 0.2 micrometers average particle size have surface areas varying from about 12 to 20 m$^2$/g depending upon how much the particles are agglomerated.

The clays useful in this invention are those pretreated clays which do not color the silicone elastomeric composition and which permits the silicone elastomeric composition to be pigmented or colored to the desired hue. Those clays which are themselves highly colored are not suitable because their use in the silicone elastomeric composition does not permit pigmenting to a desired color unless the desired color was of a similar hue to that produced by the colored clay.

Suitable clays are the aluminum silicate minerals which are commercially mined and refined for use as fillers in paints, plastics and elastomers. Clays are further defined as illite, kaolinite, and montmorillonite, all of which are complex aluminum silicate minerals. Kaolinite or kaolin clay is a preferred clay because it is readily available in a white form. For purposes of this invention, "white" is to be regarded as the absence of a hue or tint of sufficient strength to prevent the further pigmenting of the silicone elastomeric composition to a desired color. When a suitable clay is mixed into the silicone elastomeric composition, the composition may be changed to a cream color, but it is still easily pigmented as the clay has low hiding power and low tint strength.

The white clay having the required surface area is pretreated before use in the method of this invention so that the surface of the clay contains olefinic unsaturated siloxy groups. The most common siloxy groups are the vinyl siloxy group and the methacryloxy group. Pretreated white clays having the required surface area and surface treatment are commercially available. A typical pretreated clay is a calcined kaolin having an average particle size of 0.8 micrometers that has been treated with vinyl-tris(beta-methoxyethoxy)silane in a water slurry, then dried to yield a vinylsiloxy treated kaolin.

As little as 1 part by weight of pretreated, white clay is useful in improving the heat stability of the silicone elastomer of this invention. Increasing the amount of pretreated, white clay to 10 or 20 parts by weight of clay to 100 parts by weight of mixture (1) further improves the heat stability. When 110 parts of pretreated, white clay was added to a mixture (1) falling within the requirements of this invention, the heat stability of the resulting silicone elastomer was improved over a similar formulation made with an untreated ground quartz filler (commonly used in silicone elastomers) falling outside the scope of this invention. The retention of physical properties was not as high in the case of this composition using a large amount of pretreated, white clay as when a smaller amount was used. It is to be noted, however, that the initial properties of the compositions are also different.

The preferred amount of pretreated, white clay to be used in the method of this invention is dependent upon the requirement of the cured silicone elastomer, as well as the other ingredients used in the silane elastomeric composition. As more clay is added, for instance, the durometer of the cured silicone elastomer rises. If there is a specified durometer in the lower ranges, the amount of filler in the silicone elastomer will have to be at a lower level than if the specified durometer were in the higher ranges. Such effects are well known in the art and the optimum amount of the various ingredients is easily determined by simple experimentation.

The compositions of this invention, containing the pretreated, white clay used in this invention, can be pigmented to a desired or required color because the clay useful in this invention does not in itself color the composition. Many of the previously known methods of improving the heat stability of silicone elastomers relied upon the addition of materials which strongly colored the composition so that the choice of colors that could be produced was severely limited. The method of this invention thus produces a composition having both improved heat stability and pigmentability through the use of a commercially obtainable and low cost ingredient. The combination of the specified mixture (1) and the pretreated, white clay (2) has been unexpectedly found to provide these advantages.

Inorganic extending filler which has not been treated can optionally be added to the composition used in this method. The use of untreated inorganic extending filler will dilute the effect of using the pretreated, white clay so the relative amounts of clay and untreated inorganic extending filler must be judged by their effect upon the properties of the cured silicone elastomer. Inorganic extending fillers useful in silicone elastomers are well known in the art.

The compositions of this invention can be pigmented with the well-known pigments available for use with silicone elastomer. The pigments are heat stable and have little or no effect upon the properties of the vulcanized silicone elastomer. The pigments are normally inorganic oxides or salts which are finely dispersed in a silicone polymer to give a masterbatch which can be easily dispersed during the mixing of the silicone elastomeric composition.

The silicone elastomeric composition contains an organic peroxide vulcanizing agent suitable for vulcanizing the polydiorganosiloxane in the silicone elastomeric mixture. Since the polydiorganosiloxane contains vinyl radicals, it can be vulcanized with either "non-vinyl specific" or "vinyl specific" organic peroxides. Representative of the vinyl specific organic peroxides are ditertiary-butylperoxide and 2,5-bis-(tertbutylperoxy)-2,5-dimethylhexane. Representative of the non-vinyl specific peroxides are benzoylperoxide, dicumylperoxide, and 2,4-dichlorobenzoylperoxide. All these organic peroxide vulcanizing agents and their properties are well known in the art. The properties of the cured silicone elastomer can be altered by the type and amount of vulcanizing agent used to cure the composition. Typical changes due to such choices are well recognized in the art. The vulcanizing agent is generally present in amounts from 0.1 to 5 parts by weight per 100 parts by weight of silicone elastomer base, preferably from 0.5 to 2.0 parts by weight.

The first step of the method of this invention is mixing the mixture (1), pretreated, white clay (2), organic peroxide vulcanizing agent (3), and optional ingredients. Methods of mixing that are common in the silicone elastomer art and which are suitable for this invention include mixing with a dough mixer, a rubber compounding mill, or with a Banbury mixer. The order of mixing is not critical. Ordinarily, the mixture (1) is placed in the mixer, the clay (2) and other additives are added and mixed until homogeneous, then the vulcanizing agent is added and mixed until homogeneous. When pigment is used to color the silicone elastomeric composition to a desired color, the pigment should be added to the mixing procedure along with the clay (2) and other additives so that it is well distributed throughout the mixture, resulting in a uniform color.

After the improved silicone elastomeric composition is prepared in the mixing step, the composition is formed to the desired shape. The composition can be formed into a shape by any of the conventional well-known methods of forming elastomeric curable compositions such as press molding, injection molding, calendering, and extruding, both supported and unsupported.

The shaped composition is then cured or vulcanized by heating to an elevated temperature for a time sufficient to cause decomposition of the organic peroxide vulcanizing agent and subsequent crosslinking of the polydiorganosiloxane. The time and temperature necessary to cause vulcanization of the stock are dependent upon the organic peroxide vulcanizing agent chosen, the method of heating, the method of forming the composition into a shape, and the thickness of the part. The temperature that is appropriate for a given set of conditions is well known in the silicone elastomer art. Typical temperature are from 110° C. to 175° C. for molding operations to as high as 300° C. for the ovens used in continuous hot air vulcanization operations.

The cured silicone elastomers produced by following the method of this invention have improved heat stability when compared to similar cured silicone elastomers produced in a similar manner, but not including the pretreated, white clay used in the method of this invention. It is completely unexpected that the inclusion of as little as 1 part by weight pretreated, white clay in 100 parts by weight of silicone elastomeric composition would significantly improve the resistance of the stock to change in physical properties upon exposure to heat. The amounts of pretreated, white clay that are useful and the availability of the pretreated, white clay makes the method of this invention a particularly desirable method of improving the heat stability of silicone elastomers. The method is additionally useful in that the silicone elastomers can be of any desired or required color.

The silicone elastomers produced by the method of this invention are suitable for uses customarily known for silicone elastomers such as molded parts for high temperature applications, gaskets, O-rings, diaphragms, tubing, and insulated electrical wiring. Insulated electrical wiring can be easily colored to conform to the required color codes.

The following examples are include for illustrative purposes only and should not be construed as limiting the invention which is properly delineated by the appended claims. All parts are parts by weight.

EXAMPLE 1

This example shows the improvement in heat aging obtained when a minor amount of pretreated, white clay is present in a silicone elastomeric composition.

Mixtures were prepared on a two-roll rubber mill by mixing 100 parts of a commercial silicone mixture with various amounts of pretreated, white clay as shown in Table 1. The commercial silicone elastomeric mixture contained 100 parts of a dimethylvinylsiloxy endblocked polydiorganosiloxane gum having both dimethylsiloxy units and methylvinylsiloxy units in an amount such that the gum averaged about 0.09 percent by weight vinyl radical, and about 30 parts of treated reinforcing silica filler having a surface area of about 250 m²/g. The reinforcing silica filler was treated in situ with hydroxyl endblocked polydimethylsiloxane fluid. The mixture contained approximately 0.07 percent by weight vinyl radical.

The pretreated, white clay was a calcined kaolin clay which had been treated with approximately 1 percent by weight of vinyl-tris(beta-methoxyethoxy)silane. Thus the clay had a maximum of about 0.1 percent by weight of vinyl radical in the form of vinyl siloxy groups bonded to its surface. The treated kaolin had an average particle size of about 0.81 micrometers.

Each mixture was catalyzed with either one part of catalyst A (50 percent active powder of 2,5-bis-(tert-butylperoxy)-2,5-dimethylhexane, a vinyl specific catalyst) or 1.5 parts of catalyst B (50 percent active paste of 2,4 dichlorobenzoyl peroxide, a non-vinyl specific catalyst) as shown in Table 1.

Each catalyzed mixture was pressed into a test slab approximately 2.54 mm thick and cured for 10 minutes at 171° C. in the case of catalyst A, or 5 minutes at 116° C. in the case of catalyst B. After press curing, the slabs were cut into test pieces and tested according to ASTM D2240 for durometer, and ASTM D412 for tensile strength and percent elongation at break. The test results are shown in Table 1.

Additional test pieces were heat aged in an air circulating oven for 24 hours at 250° C., cooled, and tested as above. The change in properties due to the heat aging was then calculated. These results are shown in Table 1.

The change in physical properties caused by the heat aging of the test pieces is much less in those containing a small amount of pretreated, white clay than in those test pieces without the added pretreated, white clay. This improvement in heat aging is unexpected since only a small amount of pretreated, white clay was added. The total filler content of the cured elastomer was not changed significantly. The amount of vinyl radical present on the pretreated, white clay was only about 14 percent or 28 percent of the vinyl present in the base, depending upon the amount of pretreated, white clay used. The total amount of vinyl radical was not changed significantly.

TABLE 1

| Pretreated, white clay, parts | None | 10 | 20 | None | 10 |
|---|---|---|---|---|---|
| Catalyst | A | A | A | B | B |
| After press cure | | | | | |
| Durometer, Shore A | 38 | 41 | 46 | 40 | 43 |
| Tensile strength, MPa | 4.75 | 5.41 | 5.86 | 4.86 | 5.37 |
| Elongation, percent | 485 | 440 | 370 | 410 | 360 |
| After heat aging 24 hours at 250° C. | | | | | |
| Durometer, Shore A | 52 | 40 | 45 | 45 | 42 |
| Tensile strength, MPa | 2.58 | 4.96 | 5.72 | 2.72 | 6.20 |
| Elongation, percent | 85 | 340 | 340 | 120 | 330 |
| Change in properties due to heat aging | | | | | |
| Durometer, Shore A | +14 | −1 | −1 | +5 | −1 |
| Tensile strength, percent | −46 | −8 | −2 | −44 | +15 |
| Elongation, percent | −83 | −23 | −9 | −71 | −8 |

EXAMPLE 2

The previous Example was repeated using a different commercial silicone mixture. The mixture of this Example was the same as in Example 1 except it contained about 43 parts of treated reinforcing filler so that the mixture contained about 0.064 percent by weight vinyl radical.

Compositions were prepared and tested as in Example 1. The test results shown in Table 2 show that the addition of minor amounts of the pretreated, white clay again improved the resistance to physical property change caused by heat aging.

TABLE 2

| Pretreated, white clay, parts | None | 1 | 10 | 20 | None | 10 | 20 |
|---|---|---|---|---|---|---|---|
| Catalyst | A | A | A | A | B | B | B |
| After press cure | | | | | | | |
| Durometer, Shore A | 41 | 42 | 45 | 48 | 40 | 42 | 44 |
| Tensile strength, MPa | 7.41 | 7.85 | 7.81 | 7.72 | 4.75 | 6.20 | 6.13 |
| Elongation, percent | 520 | 530 | 470 | 390 | 425 | 430 | 350 |
| After heat aging 24 hours at 250° C. | | | | | | | |
| Durometer, Shore A | 51 | 44 | 46 | 52 | 48 | 45 | 52 |
| Tensile strength, MPa | 3.31 | 4.34 | 7.06 | 7.03 | 3.65 | 7.44 | 7.03 |
| Elongation, percent | 150 | 240 | 410 | 360 | 170 | 425 | 350 |
| Change in properties due to heat aging | | | | | | | |
| Durometer, Shore A | +10 | +2 | +1 | +4 | +8 | +3 | +8 |
| Tensile strength, percent | −55 | −45 | −4 | −9 | −23 | +20 | +14 |
| Elongation percent | −71 | −55 | −13 | −8 | −60 | −1 | 0 |

EXAMPLE 3

The effect of using a clay similar to that of Example 2 but without treatment was evaluated.

The filler was a calcined kaolin clay, further identified as anhydrous aluminum silicate, $AL_2O_3.2SiO_2$ having an average particle size of about 0.8 micrometer with at least 70 percent by weight of the particles being less than 2 micrometers.

The mixtures of Example 2 were repeated, except the untreated clay described above was used in place of the pretreated, white clay. Preparation of samples and testing was as in Example 1. The results are shown in Table 3.

The untreated clay did not improve the resistance to physical property change caused by heat aging in the manner or to the degree as did the pretreated, white clay of this invention.

EXAMPLE 4

The effect of adding a large quantity of pretreated, white clay and untreated extending filler was evaluated.

The mixture of Example 1 was mixed with 110 parts of the pretreated, white clay described in Example 1. The mixture of Example 1 was also mixed with 110 parts of ground quartz filler having a nominal particle size of 5 micrometers. This is a commercial extending filler commonly used in silicone elastomer. The mixtures were prepared and tested as in Example 1. The results are shown in Table 4.

The change in properties due to the effect of heat aging is much greater with the untreated extending filler than with the pretreated, white clay.

TABLE 3

| Untreated, clay, parts | None | 10 | 20 |
|---|---|---|---|
| Catalyst | A | A | A |
| After press cure | | | |
| Durometer, Shore A | 40 | 40 | 32 |
| Tensile strength, MPa | 6.76 | 6.41 | 6.13 |
| Elongation, percent | 570 | 590 | 820 |
| After heat aging 24 hours at 250° C. | | | |
| Durometer, Shore A | 60 | 54 | 55 |
| Tensile strength, MPa | 1.03 | 1.56 | 1.48 |
| Elongation, percent | 30 | 200 | 100 |
| Change in properties due to heat aging | | | |
| Durometer, Shore A | +20 | +14 | +23 |
| Tensile strength, percent | −85 | −71 | −76 |
| Elongation percent | −95 | −66 | −88 |

TABLE 4

| Pretreated, white clay, parts | 110 | — | 110 | — |
|---|---|---|---|---|
| Untreated extending filler, parts | — | 110 | — | 110 |
| Catalyst | A | A | B | B |
| After press cure | | | | |
| Durometer, Shore A | 76 | 60 | 73 | 63 |
| Tensile strength, MPa | 6.20 | 3.62 | 6.48 | 3.86 |
| Elongation, percent | 110 | 365 | 120 | 205 |
| After heat aging 24 hours at 250° C. | | | | |
| Durometer, Shore A | 80 | 65 | 78 | 65 |
| Tensile strength, MPa | 5.00 | 5.99 | 5.37 | 5.72 |
| Elongation, percent | 80 | 155 | 100 | 120 |
| Change in properties due to heat aging | | | | |
| Durometer, Shore A | +4 | +5 | +5 | +2 |
| Tensile strength, percent | −19 | +66 | −17 | +48 |
| Elongation percent | −27 | −58 | −17 | −42 |

EXAMPLE 5

The use of pretreated white clay in a mixture similar to that of Example 1, but containing about 85 parts of treated reinforcing silica filler was evaluated. The mixture used in this experiment contained about 0.05 percent by weight vinyl radical.

The mixture was mixed with the amount of pretreated, white clay of Example 1 as shown in Table 5 and one part of either catalyst A or B as shown. The compositions were prepared and tested as in Example 1.

The results show that the addition of a minor amount of pretreated, white clay improved the resistance to physical property change caused by heat aging.

TABLE 5

| Pretreated, white clay, parts | None | 10 | None | 10 |
|---|---|---|---|---|
| Catalyst | A | A | B | B |
| After press cure | | | | |
| Durometer, Shore A | 61 | 65 | 59 | 65 |
| Tensile strength, MPa | 7.41 | 7.03 | 7.96 | 8.10 |
| Elongation, percent | 460 | 380 | 420 | 380 |
| After heat aging 24 hours at 250° C. | | | | |
| Durometer, Shore A | 93 | 82 | 83 | 80 |
| Tensile strength, MPa | 3.10 | 5.68 | 4.07 | 6.55 |
| Elongation, percent | 40 | 190 | 50 | 190 |
| Change in properties due to heat aging | | | | |
| Durometer, Shore A | +32 | +17 | +24 | +15 |
| Tensile strength, percent | −58 | −19 | −49 | −19 |
| Elongation percent | −91 | −50 | −88 | −50 |

EXAMPLE 6

This example shows the effect of pretreated, white clay added to a mixture having a vinyl radical content of greater than 0.1 percent by weight, an amount outside the claims of this invention.

This mixture contained a dimethylvinylsiloxy endblocked polydimethylsiloxane gum, the gum being approximately 0.044 percent by weight vinyl radical. The gum was reinforced with 63 parts of a fume silica having a surface area of about 250 m$^2$/g, the surface being treated with trimethylsiloxy groups. Also included was a dimethylvinylsiloxy endblocked polydiorganosiloxane fluid having both dimethylsiloxy units and methylvinylsiloxy units in an amount such that the fluid was 7.55 percent by weight vinyl radicals. The mixture contained approximately 0.15 percent by weight vinyl radical.

Compositions were prepared of the above base and the pretreated, white clay of Example 1 in the amount shown in Table 6 in combination with catalyst A and B of Example 1. The compositions were prepared and tested as in Example 1. The results in Table 6 show that the pretreated, white clay was not effective in improving the heat stability of this comparative mixture.

TABLE 6

| Pretreated, white clay, parts | None | 10 | None | 10 |
|---|---|---|---|---|
| Catalyst | A | A | B | B |
| After press cure | | | | |
| Durometer, Shore A | 45 | 48 | 45 | 49 |
| Tensile strength, MPa | 9.47 | 9.47 | 9.30 | 8.27 |
| Elongation, percent | 800 | 790 | 725 | 630 |
| After heat aging 24 hours at 250° C. | | | | |
| Durometer, Shore A | 63 | 63 | 54 | 61 |
| Tensile strength, MPa | 4.93 | 5.27 | 6.70 | 6.37 |
| Elongation, percent | 240 | 300 | 340 | 230 |
| Change in properties due to heat aging | | | | |
| Durometer, Shore A | +18 | +15 | +9 | +12 |
| Tensile strength, percent | −48 | −44 | −28 | −23 |
| Elongation percent | −70 | −62 | −53 | −64 |

EXAMPLE 7

This example shows the effect of pretreated, white clay in another mixture having a vinyl radical content of greater than 0.1 percent by weight, an amount outside the claims of this invention.

The mixture of this example contained the same dimethylvinylsiloxy endblocked polydiorganosiloxane gum of Example 1. The treated reinforcing filler was about 27 parts of a fume silica having a surface area of about 250 m$^2$/g. The reinforcing filler was treated in situ with a mixture of a hydroxyl endblocked polymethylphenylsiloxane fluid and a hydroxyl endblocked polymethylvinylsiloxane fluid. The mixture contained approximately 0.2 percent by weight vinyl radical.

Compositions were prepared of the above mixture and the pretreated, white clay of Example 1 in the amounts shown in Table 7 in combination with catalyst A and B of Example 1. The compositions were prepared and tested as in Example 1. The results in Table 7 show that the pretreated, white clay was not effective in improving the heat stability of this composition, when catalyst A was used. With catalyst B, it appears that the stock did not cure properly when pressed, but cured during the heat aging.

TABLE 7

| Pretreated, white clay, parts | None | 10 | 20 | None | 10 | 20 |
|---|---|---|---|---|---|---|
| Catalyst | A | A | A | B | B | B |
| After press cure | | | | | | |
| Durometer, Shore A | 39 | 41 | 48 | 34 | 36 | 40 |
| Tensile strength, MPa | 3.03 | 4.34 | 5.86 | 3.24 | 3.48 | 3.24 |
| Elongation, percent | 260 | 260 | 260 | 335 | 290 | 220 |
| After heat aging 24 hours at 250° C. | | | | | | |
| Durometer, Shore A | 35 | 41 | 41 | 34 | 28 | 32 |
| Tensile strength, MPa | 2.10 | 2.96 | 3.93 | 2.14 | 4.62 | 5.10 |
| Elongation, percent | 160 | 160 | 240 | 155 | 430 | 420 |
| Change in properties due to heat aging | | | | | | |
| Durometer, Shore A | −4 | 0 | −7 | 0 | −8 | −8 |
| Tensile strength, percent | −31 | −32 | −33 | −34 | +33 | +84 |
| Elongation percent | −38 | −38 | −8 | −54 | +48 | +90 |

EXAMPLE 8

This example compares the effect of pretreated, white clay and an untreated clay when used in a pigmented silicone elastomer.

Four samples were prepared on a two-roll rubber mill using the commercial silicone elastomeric mixture of Example 1, the pretreated, white clay of Example 1, and an untreated clay in the amounts shown below in Table 8. The untreated clay was a commercial filler (Hydrite MP sold by Georgia Kaolin Company) which is described as a kaolinite which has been washed and sized. The average surface area is about 6 m²/g. Each sample was pigmented with the parts shown of a commercial yellow pigment used in silicone rubber (Ferro Corporation's CV1936 yellow). Each sample was catalyzed with 1 part of the catalyst A of Example 1.

After thorough mixing, each sample was molded into a test sheet by pressing for 10 minutes at 171° C.

After vulcanization, the samples appeared as shown in Table 8. The pretreated, white clay containing samples gave the desired yellow color and good cured silicone elastomer. The untreated clay adversely effected the color obtained in both the low amount and the high amount. The high amount of untreated clay caused the mixture to fail to cure properly.

A portion of each sample was then exposed to heat aging for 24 hours in an oven at 250° C. After this period, the samples were examined with the results shown in Table 8. Samples 1 and 3 darkened, but remained clearly yellow. Sample 2 darkened to a tan color while sample 4 became a cream color and brittle in character.

The pretreated white clay containing samples, 1 and 3, were capable of pigmenting to the desired yellow color, vulcanized properly, and gave no appreciable change in color or physical properties after heat aging.

The samples containing the comparative clay which falls outside the limits of the claims did not allow pigmenting to the desired color at both filler levels, nor did they cure properly at both filler levels. These samples also showed excessive change in color upon heat aging.

TABLE 8

| | Sample | | | |
|---|---|---|---|---|
| | 1 | 2 | 3 | 4 |
| Silicone mixture | 100 | 100 | 100 | 100 |
| Pretreated, white clay | 10 | — | 110 | — |
| Untreated clay | — | 10 | — | 110 |
| Pigment | 0.1 | 0.1 | 0.8 | 0.8 |
| Organic peroxide | 1.0 | 1.0 | 1.0 | 1.0 |
| Color as molded | pale yellow | darker than 1 | similar to 1 | brownish-yellow |
| Cure | OK | OK | OK | none |
| Heat aged for 24 hours at 250° C. | | | | |
| Color after heat aging | pale yellow | tan | yellow | cream |
| Cure after heat aging | OK | OK | OK | brittle |

That which is claimed is:

1. Method of improving the heat stability of a silicone elastomer comprising
    (A) mixing (1) 100 parts by weight of a mixture consisting essentially of 100 parts by weight of a polydiorganosiloxane gum having organic radicals selected from the group consisting of methyl, vinyl, phenyl, and 3,3,3-trifluoropropyl, and from 10 to 100 parts by weight treated reinforcing silica filler, said mixture (1) having a vinyl radical content of from 0.01 to 0.1 percent by weight; (2) from 1 to 150 parts by weight of pretreated, white clay having a surface area of less than 50 m²/g, said surface having been treated so that the surface contains olefinic unsaturated siloxy groups; and (3) organic peroxide vulcanizing agent to yield an improved silicone elastomeric composition
    (B) forming the improved silicone elastomeric composition into a shape, and
    (C) heating the formed silicone elastomeric composition to an elevated temperature for a time sufficient to vulcanize the silicone elastomeric composition, the vulcanized silicone elastomer having improved heat stability, without effecting the ability of the silicone elastomeric composition to be pigmented to a desired color.

2. The method of claim 1 in which the mixture (1) is heated before the addition of the pretreated, white clay.

3. The method of claim 1 in which the mixture (1) has a vinyl radical content of from 0.025 to 0.1 percent by weight.

4. The method of claim 2 in which the mixture (1) has a vinyl radical content of from 0.025 to 0.1 percent by weight.

5. The method of claim 2 in which the mixture (1) has a vinyl radical content of from 0.05 to 0.1 percent by weight.

6. The method of claim 2 in which the mixture (1) has a vinyl radical content of from 0.05 to 0.07 percent by weight.

7. The method of claim 1 in which the treated reinforcing silica filler is present in an amount of from 25 to 85 parts by weight.

8. The method of claim 7 in which the mixture (1) has a vinyl radical content of from 0.025 to 0.1 percent by weight and the pretreated, white clay is kaolinite.

9. The method of claim 8 in which the kaolinite is present in an amount of from 10 to 110 parts by weight and has a surface containing vinylsiloxy groups.

10. The method of claim 9 in which the organic peroxide vulcanizing agent is vinyl specific and present in an amount of from 0.5 to 2 parts by weight.

11. The method of claim 10 in which there is also present a heat stable pigment.

* * * * *